Sept. 1, 1936.     A. F. HOESEL     2,052,769
REFRIGERATING SYSTEM
Filed Jan. 19, 1934     2 Sheets—Sheet 1

Inventor:
Anthony F. Hoesel

Patented Sept. 1, 1936

2,052,769

UNITED STATES PATENT OFFICE 2,052,769

REFRIGERATING SYSTEM

Anthony F. Hoesel, Chicago, Ill., assignor to Peerless Ice Machine Company, Chicago, Ill.

Application January 19, 1934, Serial No. 707,235

6 Claims. (Cl. 62—4)

The present invention relates to improvements in refrigerating systems and especially to those systems used in the storage of meat and similar products.

Most plants for that purpose, and especially the smaller sized ones, are refrigerated with intermittently operating compressors. This intermittent operation produces varying amounts of moisture content of the air in the cooled compartment, the period of highest moisture content being just before the start of the refrigerating cycle and the longer the off cycle of the compressor, the greater the moisture content at that particular time.

During hot weather, due to the greater temperature difference between the inside and outside temperatures, the heat inleakage through the refrigerator walls is at its maximum, therefore the on cycle time is at its maximum and the off cycle time is at its minimum. A minimum off cycle time favors a low build-up of the moisture content of the air of cooled compartments containing hydrous matter in storage therein during the off cycle.

During cold weather, the conditions are reversed and due to the lower temperature difference between the inside and outside temperatures the heat inleakage through the refrigerator walls is at its minimum, therefore the on cycle time is at a minimum and the off cycle time is at a maximum. This condition favors a high build-up of the moisture content of the air during the off cycle.

It is well recognized in the industry that meats kept in intermittently refrigerated compartments tend to slime upon their surfaces more so during cold weather than warm weather, and the above is an explanation, in part at least, as to the cause.

Most of these plants operate within certain temperature limits, and heretofore no attempts have been made to operate in on and off cycles except directly proportionate to the rate of heat input.

Another object is to vary the rate of heat absorption proportional to outside temperature conditions, whereby at low outside temperatures the on cycle is greatly prolonged over that of the present normal operation, this prolonged operation at decreased temperature differentials between the cooling unit and the air in the compartment being cooled giving an increased volume of air circulation, during an extended time period.

In the drawings, Figure 1 is a cross-sectional view of the differential temperature throttle valve embodied in the invention.

Figure 1:
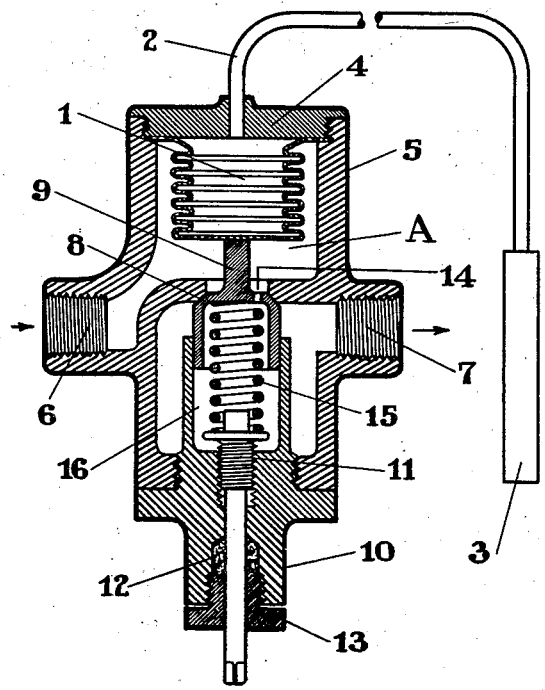

Referring to Figure 1 showing differential throttling valve "A" the bellows 1, capillary tube 2, and thermal bulb 3 provide a closed system, which is charged with a suitable thermostatic fluid. The bellows cover 4 is threaded into the body 5, which has an inlet port 6 and outlet port 7. The body 5 has a seat 8 engaged by valve 9, the upper end of which is in abutting relation to the bellows 1. Bonnet 10 screw threaded into body 5 carries an adjusting screw 11, packing 12, and packing gland 13. The adjusting screw 11 engages a spring 15 seated between the adjusting screw 11 and valve 9, which is movably guided by the bore 16 in bonnet 10. The bore 16 and valve seat 8 are of equivalent areas, the valve 9 is a snug fit in the bore 16, and the bleeder hole 14 communicating with bore 16 and inlet port 6 provides a balanced pressure condition, whereby variations of pressure at outlet port 7 do not influence the action of the valve 9.

Figure 2:
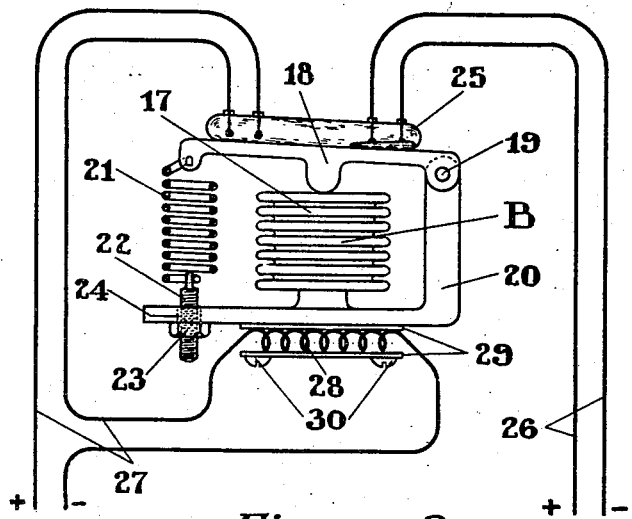
Figure 2 is an elevational view of the room temperature thermostat embodied in the invention.

Referring to Figure 2 showing room temperature thermostat "B", the bellows 17 contains a volatile temperature responsive fluid. The upper end of the bellows 17 engages a rocking switch carrier 18, one end of which is pivoted at point 19 of the frame 20. Spring 21 fastened to the rocking switch carrier 18 and adjusting screw 22 exerts an adjustable pull on the rocking switch lever 18. Adjusting nut 23 in threaded engagement with adjusting screw 22 which is a loose fit in hole 24 of frame 20 serves to vary the spring pull by varying the length of spring 21. The double throw mercury glass tube switch 25 is mounted upon the rocking switch carrier 18 and has two sets of electrical circuits, circuit 26 controlling the compressor motor operation, and circuit 27 controlling a heating element 28, which is clamped between two insulators 29 and to the bottom of frame 20 by screws 30.

Figure 3:
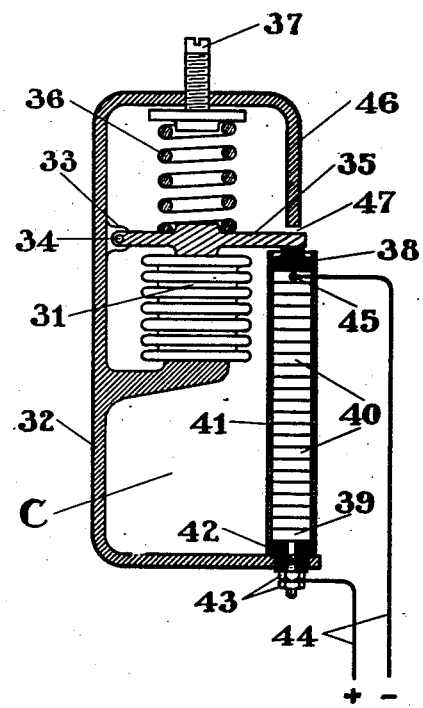
Figure 3 is a cross-sectional view of a thermostatic pressure operated carbon pile variable electrical resistance embodied in the invention.

Referring to Figure 3 showing thermostatic pressure operated carbon pile variable electrical resistance "C", bellows 31 containing a thermostatic fluid is mounted in a frame 32 which has a boss 33 for a pivot shaft 34 upon which is mounted a lever 35 which is pressed against the bellows 31 by a spring 36 adjustable in length by means of the adjusting screw 37 in threaded engagement with the frame 32. The free end of lever 35 contacts a non-conductor pressure block 38 between which and a conductor pressure receiving contact 39, a multitude of carbon discs 40 are loosely confined in an insulator tubing 41. The pressure receiving block is insulated from frame 32 by means of insulator bushing 42 and serves, with nuts 43, as a binding post for one leg of the electrical circuit 44; the other leg of the electrical circuit 44 is in electrical connection with the top of the carbon disc pile as shown at 45.

Portion 46 of frame 32 provides a limit for the bellows upward travel as shown at 47 whenever the lever 35 engages portion 46 of the frame 32.

Figure 4:
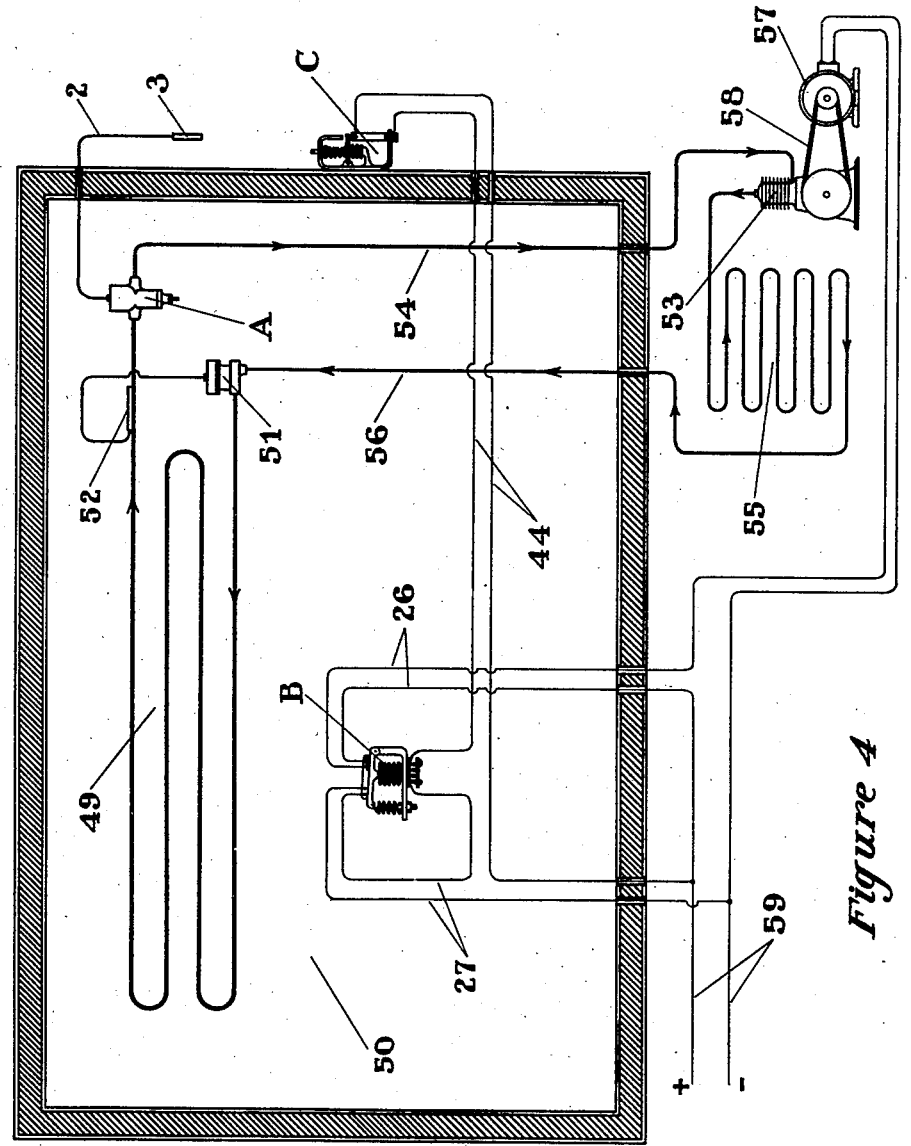
Figure 4 is a diagrammatic elevational view of a refrigerating system embodying the invention.

Referring to Figure 4, the cooling unit 49, refrigerating the enclosed compartment 50, has a thermostatically operated expansion valve 51, of a type similar to those disclosed in Patents 1,776,401, and 1,747,958, granted to Harry E. Thompson. Since valves of this type are in universal use and their operation well understood by those versed in the art, it will not be necessary to show their construction, and will suffice to remark that their prime function is to control the flow of refrigerant through the cooling unit in such relationship to the pressure in the cooling unit and temperature of the vapor return conduit at the point where thermal bulb 52 is attached, that under all normal conditions of operation the temperature of the vapor return conduit is higher than that of the coil proper. The amount of increased temperature depending upon the adjustment.

Intermediate the thermal bulb 52 and compressor 53, a valve "A" (see Figure 1) forms part of the return conduit system 54, which connects the outlet of the cooling coil 49 to the suction side of the compressor 53 which discharges the compressed vapor from the cooling coil 49 into condenser 55 where the vapor is liquefied. The valve 51 and condenser 55 are connected by means of liquid conduit 56. This layout provides a closed system in which the refrigerant is continuously circulated during the operation of the compressor 53.

The compressor 53 is operated by means of a motor 57 and belt 58, the motor 57 being under the direct control of circuit 26 of the room thermostat "B". The various electrical circuits are fed from circuit 59. One leg of the electrical circuit 27 is split to form a series circuit with thermostat "C" placed outside of refrigerated compartment 50 as shown.

The thermal bulb 3 of throttling valve "A" is placed outside of the refrigerated compartment 50 as shown.

Having described the component parts, I shall now describe their operation. Assuming warm weather conditions, the rate of heat inleakage through the walls of the refrigerated compartment, being at a maximum, ensures the maximum possible on-cycle of the compressor and the minimum off-cycle as well. Due to the high temperature conditions outside the refrigerated compartment 50, the fluid in the bellows 31, of thermostat "C", exerts a maximum pressure and raising lever 35 frees the carbon discs 40 from pressure other than their weight, thereby increasing the electrical resistance in the circuit 44, which being in series with the circuit 27 one element of which comprises the heater 28 associated with thermostat "B", decreases the heat rate output to such a point that thermostat "B" must mainly depend upon outside heat inleakage through the walls of compartment 50 raising the temperature of the entire compartment 50 to the point where the pressure of the thermostatic fluid in bellows 17 exerts sufficient pressure to move the rocking switch carrier 18 against the force of spring 21 to the point where the mercury in the switch 25 reestablishes a current in the circuit 26 controlling motor 53.

During the high outside temperature conditions, the thermostatic fluid in bulb 3 exerts sufficient pressure upon the bellows 1, of throttle valve "A", that the valve 9 is forced away from its engaging seat 8 and against the pressure of spring 15, that the passage through the valve "A" is practically unrestricted.

It may be considered, that under high outside temperature conditions, the refrigerating system will operate exactly as if the controls "A" and "C" were absent.

Assuming low temperature conditions outside the compartment 50, and controls "A" and "C" absent from the system, which would be as any standard present day refrigerating system, then due to the decreased rate of heat inleakage into the refrigerated compartment the on cycle time of the compressor would be at a minimum and the off cycle time at a maximum. Since the velocity of the convection circulation of the air in the compartment does not vary directly as the temperature difference between the air and the cooling unit, it follows that with a decreased on cycle of the compressor, there will be a decided decrease in the air circulation for equivalent extended time periods. This decreased air circulation tends to maintain higher moisture content of the air in the cooled compartment. The increase of moisture content tends to slime the surfaces of meats and similar products.

The functions of the controls "A" and "C" are to practically maintain constant time periods of the on and off cycles irrespective of the rate of heat inleakage of the cooled compartment. The manner in which this is done is as follows: Referring to Figure 4, assume the temperature outside of the cooled compartment 50 to have dropped, then the vapor pressure in the thermal bulb 3 of throttle valve "A" is lowered, allowing the bellows 1 to contact with the combined force of the refrigerant pressure in the cooling unit 49 and the force of spring 15 acting upon valve 9, which abuts bellows 1. In this state, the valve 9 becomes an automatic throttle means between the inlet port 6 and outlet port 7 of the valve "A" and maintains a pressure in the cooling unit 49. The maintained pressure has higher values for low outside temperature conditions and vice versa.

It is well known in the refrigeration art, that the temperature of cooling units is proportionate to the vapor pressure maintained in the cooling unit; it is further well known that the rate of heat absorption of a cooling unit is proportionate to the temperature difference between the cooling unit and the air passing by the cooling unit.

With the operation as outlined above, we accomplish a longer on cycle time of the system, in other words, with a comparatively warmer cooling unit, it takes a much longer time to absorb a given amount of heat, than the time necessary with a colder cooling unit.

The manner in which the off cycle time is controlled is as follows: The bellows 31, of thermostat "C" placed outside of the refrigerated compartment 50, during low temperatures, has a decreased pressure of the contained thermostatic fluid. The spring 36 exerting a constant force upon the lever 35, which engages the bellows 31 and pressure block 38, thereby exerts a force upon the carbon discs 40 proportionate to the difference in pressure between the spring 36 and the bellows 31. At low outside temperatures the force exerted upon the carbon discs 40 is at a maximum and vice versa. The conductivity of the carbon disc pile varies directly as the pressure on the pile, therefore at low outside temperatures the rate of current flow is at a maximum.

The circuit 44, of which the carbon pile is a series circuit element, also has placed in series therewith a heater element 28, mounted upon thermostat "B", which by the varying rates of current passed through the heater element 28, is thereby controlled as to the length of time necessary for sufficient heat to be absorbed by the thermostat "B", so as to increase the temperature and pressure of the thermostatic fluid in the bellows 17 to the point where the mercury tube switch 25 is tilted sufficiently to reestablish current flow in the motor circuit 26 thereby starting motor 57 and compressor 53.

Whenever low outside temperature conditions obtain, the rate of heat inleakage to the cooled compartment is comparatively slow, and time rate for the compartment to increase in temperature from 34 degrees Fahrenheit to 38 degrees Fahrenheit is greatly increased. However by a proper proportioning of the heater element 28, and the varying electrical resistance of the carbon pile 40 responsive to outside temperature conditions, it is possible to maintain a constant off cycle time irrespective of normal temperature variations outside the cooled compartment 50.

Whenever the compartment 50 reaches its desired low temperature, the pressure of the thermostatic fluid in the bellows 17 is reduced sufficiently for the spring 21 to tilt the switch carrier 18 and mercury tube switch 25, thereby breaking the motor circuit 26 and stopping the motor 57 and compressor 53. When the motor circuit 26 is broken the circuit 27 in series with the heater element 28 and carbon pile 40 is reestablished.

Whenever the thermostat "B" has had a sufficient heat input to increase the pressure of the thermostatic fluid in the bellows 17, the switch carrier 18 and mercury tube switch 25 tilt against the pressure of spring 21, and the circuit 27 is broken stopping the heating function of the heater element 28, at this time the motor circuit 26 is reestablished and the motor 57 and compressor 53 start again.

From the above it will be seen that I am enabled to practically maintain equivalent on time and off time cycles, of the cooling system, with widely varying conditions of heat load due to widely varying conditions of temperatures outside of the compartment being cooled, and thereby am enabled to prevent meats etc. from sliming, which ordinarily occurs whenever the heat load is materially lowered due to low temperature conditions prevailing outside of the refrigerated compartment, in which such meat, etc. is stored.

It is not to be construed that my system will be effective whenever the temperature conditions, outside of the cooled compartment, are as low or lower than the temperature to be maintained within the cooled compartment, since in that case, there can be no heat flow into the cooled compartment. Since the invention will generally be employed in retail meat markets, and the like, in which a cooled compartment is housed within another structure, which is at least partially heated during cold periods, it will be effective under the conditions encountered.

While the above comprises a system having the elements of my invention, it will be understood that there may be various modifications, without departing from the spirit and scope of the invention.

What I claim is:

1. In an intermittently operated refrigerating system, the combination of a compartment being cooled, a heat absorber in the compartment, means to remove the heat accumulated by the heat absorber, thermostatic means governing the on and off cycle of the heat removal means, and secondary means to substantially vary only the off cycle time responsive to temperature conditions outside the cooled compartment.

2. In an intermittently operated refrigerating system, a compartment being cooled, a heat absorber in the compartment, a refrigerant liquid circulated through the heat absorber, a pump for circulating the refrigerant, throttle means at the outlet of the heat absorber to vary the expanded pressure of the circulated refrigerant in the heat absorber during the operation of the pump, the throttle means being responsive to temperature conditions outside the cooled compartment, a decrease in outside temperature increasing the throttling action and vice versa.

3. In an intermittently operated refrigerating system, the combination of a compartment being cooled, a heat absorber in the compartment, means to remove the heat accumulated by the heat absorber, and means to vary the temperature of the heat absorber responsive to temperature conditions outside the cooled compartment and independent of the heat removal means.

4. In an intermittently operated refrigerating system, the combination of a compartment being cooled, a heat absorber in the compartment, means to remove heat from the heat absorber, the said heat absorber and the said heat removal means each having a certain maximum capacity, and means, responsive to temperature conditions outside of the cooled compartment, to vary the capacity of both the heat absorber and heat removal means by throttling the heat flow path between the heat absorber and heat removal means.

5. In an intermittently operated refrigerating system, the combination of a compartment having a variable heat inleakage and being cooled, and means to maintain a substantially uniform rate of cycling of the said refrigerating system, while maintaining a given temperature condition within the said compartment during the variations of heat inleakage.

6. The method of operating a refrigerator in which the storage compartment is cooled to a given temperature by an intermittently operated cooling unit having an on time cycle and an off time cycle and an average temperature lower than that of the compartment temperature and through which a volatile fluid is circulated responsive to a thermostatic control affected directly by temperatures outside of the refrigerator which comprises increasing the temperature of the cooling unit upon a decrease of temperature outside of the compartment and vice versa, the on and off time cycles of the cooling unit operation remaining substantially constant, within the limits of variable temperature conditions outside of the cooled compartment.

ANTHONY F. HOESEL.